US009325864B2

(12) United States Patent
Ito

(10) Patent No.: US 9,325,864 B2
(45) Date of Patent: Apr. 26, 2016

(54) IMAGE PROCESSING APPARATUS, INFORMATION PROCESSING SYSTEM, INFORMATION PROCESSING METHOD, AND STORAGE MEDIUM TO COMMUNICATE WITH EXTERNAL APPARATUS

(75) Inventor: Mario Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 620 days.

(21) Appl. No.: 13/288,556

(22) Filed: Nov. 3, 2011

(65) Prior Publication Data

US 2012/0113467 A1 May 10, 2012

(30) Foreign Application Priority Data

Nov. 10, 2010 (JP) ................................ 2010-251903

(51) Int. Cl.
*G06F 15/00* (2006.01)
*H04N 1/00* (2006.01)

(52) U.S. Cl.
CPC ....... *H04N 1/00222* (2013.01); *H04N 1/00244* (2013.01); *H04N 1/00413* (2013.01); *H04N 2201/0094* (2013.01)

(58) Field of Classification Search
None
See application file for complete search history.

(56) References Cited

U.S. PATENT DOCUMENTS

2003/0103226 A1* 6/2003 Nishio ......................... 358/1.13
2006/0262349 A1* 11/2006 Moroi ......................... 358/1.15
2009/0237728 A1* 9/2009 Yamamoto ................... 358/1.15
2011/0055323 A1* 3/2011 Kawai et al. .................. 709/203
2011/0252117 A1* 10/2011 Sng et al. ...................... 709/219

FOREIGN PATENT DOCUMENTS

JP 2007-317107 A 12/2007
JP 2008-003833 A 1/2008
JP 2008-139981 A 6/2008
JP 2009-165017 A 7/2009

* cited by examiner

*Primary Examiner* — Helen Q Zong
(74) *Attorney, Agent, or Firm* — Canon USA, Inc. IP Division

(57) ABSTRACT

An image processing apparatus may include a web service provider and a web browser. The web service provider includes a control unit to cause a processing unit to perform image processing as a web service according to a request of a web service included in an HTTP response received by a web browser. The web browser includes a first reception unit, a display unit, a transmission unit, and a second reception unit. The first reception unit receives screen data for displaying an operation screen of the image processing apparatus from an external apparatus. The display unit displays the received screen data. In response to an operation from a user being received via the operation screen, the transmission unit transmits to the external apparatus an HTTP request according to the operation received. The second reception unit receives an HTTP response including a request of a web service as a response.

10 Claims, 11 Drawing Sheets

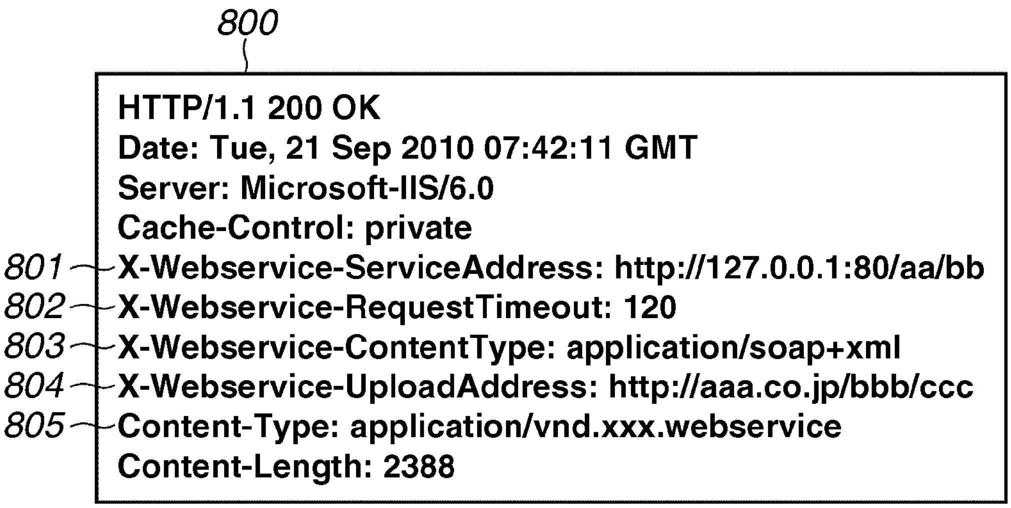

FIG.8

```
800
┌─────────────────────────────────────────────────────┐
│ HTTP/1.1 200 OK                                     │
│ Date: Tue, 21 Sep 2010 07:42:11 GMT                 │
│ Server: Microsoft-IIS/6.0                           │
│ Cache-Control: private                              │
│ X-Webservice-ServiceAddress: http://127.0.0.1:80/aa/bb │
│ X-Webservice-RequestTimeout: 120                    │
│ X-Webservice-ContentType: application/soap+xml      │
│ X-Webservice-UploadAddress: http://aaa.co.jp/bbb/ccc │
│ Content-Type: application/vnd.xxx.webservice        │
│ Content-Length: 2388                                │
└─────────────────────────────────────────────────────┘
```

801 → X-Webservice-ServiceAddress: http://127.0.0.1:80/aa/bb
802 → X-Webservice-RequestTimeout: 120
803 → X-Webservice-ContentType: application/soap+xml
804 → X-Webservice-UploadAddress: http://aaa.co.jp/bbb/ccc
805 → Content-Type: application/vnd.xxx.webservice

```
<?xml version="1.0" encoding="UTF-8"?>
<JobScript xmlns="http://www.xxx.co.jp/jobScript">
  <Scan>
    <Settings>
      <DocumentSize>auto</DocumentSize>
      <Color>glayscale</Color>
    </Settings>
  </Scan>
  <Send>
    <Settings>
      <Protocol>FTP</Protocol>
      <Destination>192.168.11.xxx</Destination>
      <FileFormat>PDF</FileFormat>
      <FileName>test.pdf</FileName>
    </Settings>
  </Send>
</JobScript>
```

```xml
<?xml version="1.0" encoding="UTF-8"?>
<JobResponse xmlns="http://www.xxx.co.jp/jobResponse">
   <ResultCode>OK</ResultCode>
 </JobResponse>
```

ERROR_NAME=TIMEOUT_ERROR&HTTP_STATUS_CODE=200

IMAGE PROCESSING APPARATUS, INFORMATION PROCESSING SYSTEM, INFORMATION PROCESSING METHOD, AND STORAGE MEDIUM TO COMMUNICATE WITH EXTERNAL APPARATUS

BACKGROUND OF THE INVENTION

1. Field of the Invention

The present invention relates to an image processing apparatus including a web browser which can provide its function as a web service via an operation screen displayed by the web browser, a system including the image processing apparatus and an external apparatus, an information processing method, and a storage medium.

2. Description of the Related Art

A conventional image processing apparatus is generally known that stores a function of each device such as a scanner, a printer, a fax, and a network transmission device within one housing. A form in which an operation unit of such an image processing apparatus uses the web browser is typically known. As above-described form in which the function is used via the operation screen displayed by the web browser, a method described in Japanese Patent Application Laid-Open No. 2008-003833 is known.

According to Japanese Patent Application Laid-Open No. 2008-003833, based on screen information (screen data) received from an external apparatus on a network, the web browser displays on the operation unit the operation screen related to an image processing function. Upon receiving a user's operation via the operation screen, the web browser once transmits content of the user's operation to the external apparatus. As a response to the content of the transmitted operation, the web browser receives a script (screen control flow) from the external apparatus. The web browser, based on the received script, generates a simple object access protocol (SOAP) message for calling a web service provided by the image processing apparatus, transmits the generated SOAP message to a provider of the web service, and then uses the function of the image processing apparatus as the web service.

According to Japanese Patent Application Laid-Open No. 2008-003833, the web browser generates a processing request of the SOAP message for using the web service according to the script (screen control flow) received from the external apparatus.

According to the above-described conventional method, data received by the web browser as a response to the user's operation is written in a script format. In order to cause the web service provided by the image processing apparatus to execute the script, the data needs to be converted into a message (e.g., SOAP message) that the web service can interpret.

SUMMARY OF THE INVENTION

The present invention is directed towards reducing a workload of processing for converting data received by a web browser into a protocol that a provider of a web service can interpret.

According to an aspect of the present invention, an image processing apparatus includes a web service provider having a control unit configured to cause a processing unit included in the image processing apparatus to perform image processing as a web service according to a request of a web service included in a hypertext transfer protocol (HTTP) response received by a web browser; and the web browser, wherein the web browser includes: a first reception unit configured to receive screen data for displaying an operation screen of the image processing apparatus from an external apparatus connected to a network, a display unit configured to display the operation screen based on the received screen data, a transmission unit configured, in response to an operation from a user being received via the operation screen, transmit to the external apparatus an HTTP request according to the operation received via the operation screen, and a second reception unit configured to receive an HTTP response including a request of a web service as a response to the HTTP request.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of a header of an HTTP response message received by the MFP from the external apparatus.

FIG. 9 illustrates an example of a processing request included in the HTTP response message received by the MFP from the external apparatus.

FIG. 10 illustrates an example of a processing response included in an HTTP request message transmitted by the MFP to the external apparatus.

FIG. 11 illustrates an example of a processing response included in the HTTP request message transmitted by the MFP to the external apparatus.

DESCRIPTION OF THE EMBODIMENTS

Various exemplary embodiments, features, and aspects of the invention will be described in detail below with reference to the drawings.

Figure 1:
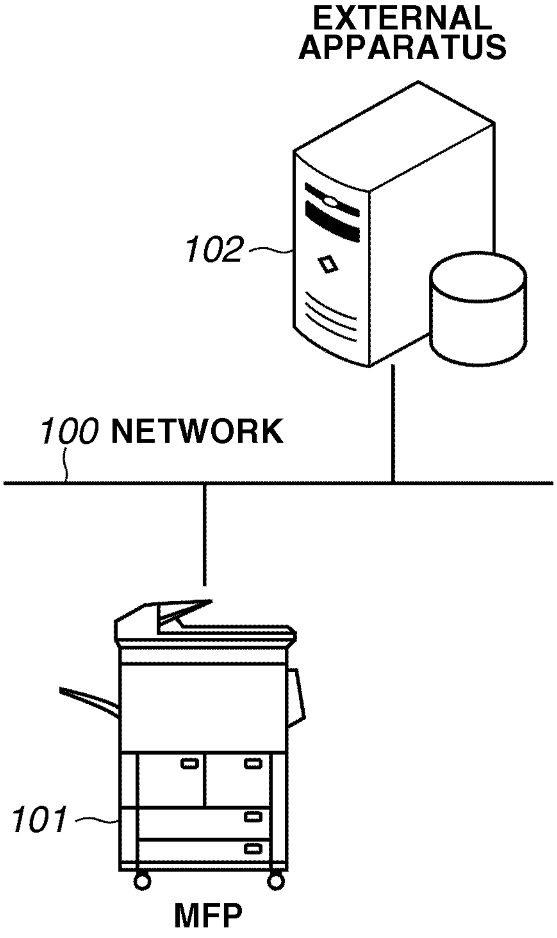
FIG. 1 illustrates an information processing system including a multi functional peripheral (MFP) and an external apparatus according to an exemplary embodiment.

FIG. 1 illustrates an information processing system according to an exemplary embodiment. The information processing system connects a multifunction peripheral (MFP) 101 and an external apparatus 102 via a network 100. The MFP 101 includes various types of image processing functions such as an image forming (printing) function, an image reading function, and an image transmitting function, and a web browser function for communicating with the external apparatus 102 according to a hypertext transfer protocol (HTTP). The external apparatus 102 is a web server and distributes web contents to the MFP 101 and other devices. The external apparatus 102 on a network can provide an operation screen of the MFP 101 as the web content to the MFP 101.

According to the present exemplary embodiment, the external apparatus 102 exists outside a local area network including the MFP 101. The MFP 101 is managed by a gateway (not illustrated) with a private internet protocol (IP) address. The gateway exists between the network 100 and the MFP 101 and converts the private IP address into a global IP address.

Figure 2:
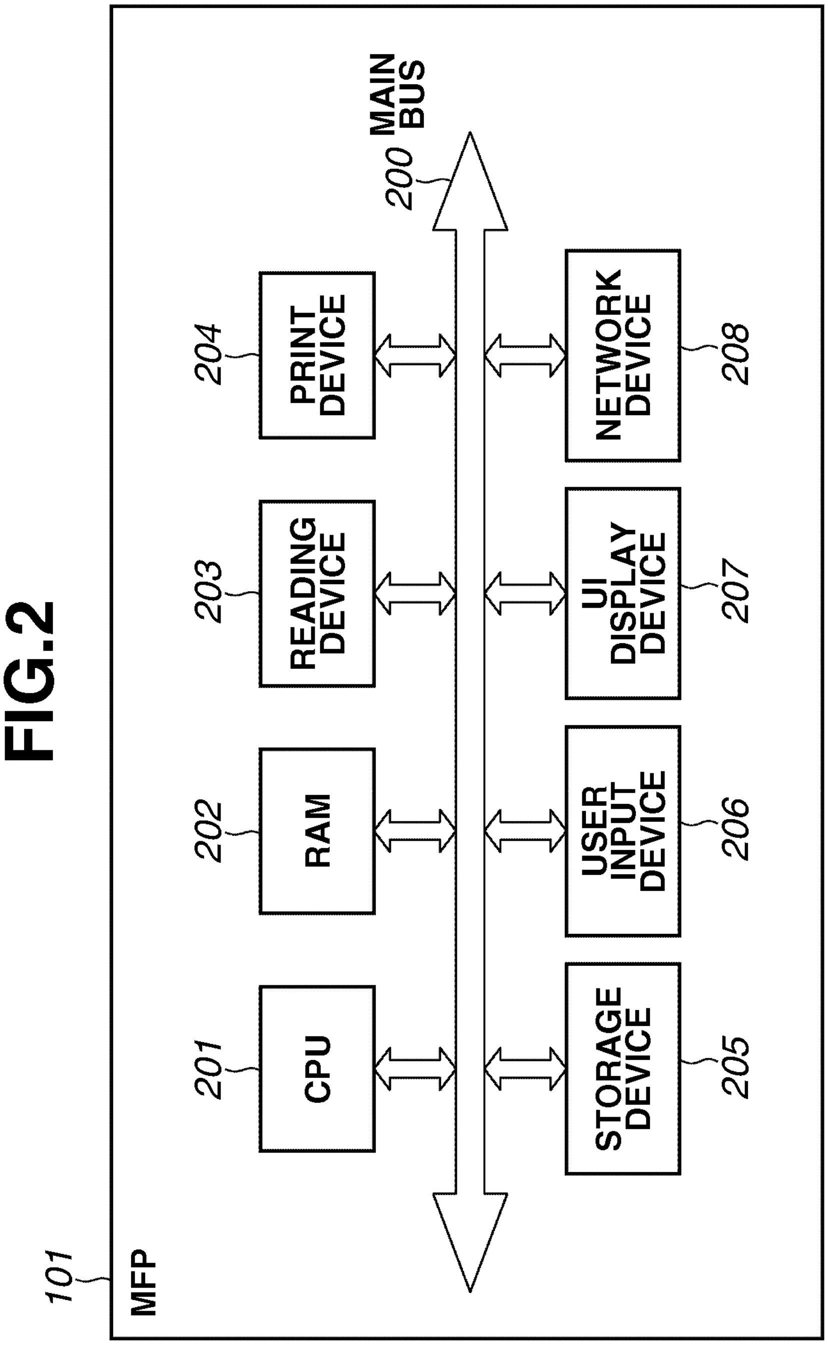
FIG. 2 is a block diagram illustrating a hardware configuration of the MFP illustrated in FIG. 1.

FIG. 2 illustrates an example of a hardware configuration of the MFP 101 illustrated in FIG. 1. The MFP 101 includes a central processing unit (CPU) 201 that controls an entire apparatus and a random access memory (RAM) 202 that provides the CPU 201 with a work area. The MFP 101 further includes a reading device 203 that reads an image in a document and a print device 204 that prints image data. The MFP 101 further includes a storage device 205 (e.g., hard disk drive (HDD) and nonvolatile RAM (NVRAM)) that stores data, various setting parameters, and a control program.

The MFP 101 further includes an input device 206 (e.g., a keyboard and a mouse) that receives a user's operation and a display device 207 (e.g., liquid crystal display) that displays the operation screen of the MFP 101. The MFP 101 further includes a network device 208 that performs network communication with the external apparatus 102 and other devices, and a main bus 200. In FIG. 2, the input device 206 and the display device 207 are illustrated as separate devices. However, these devices may integrally configure an operation unit.

Figure 3:
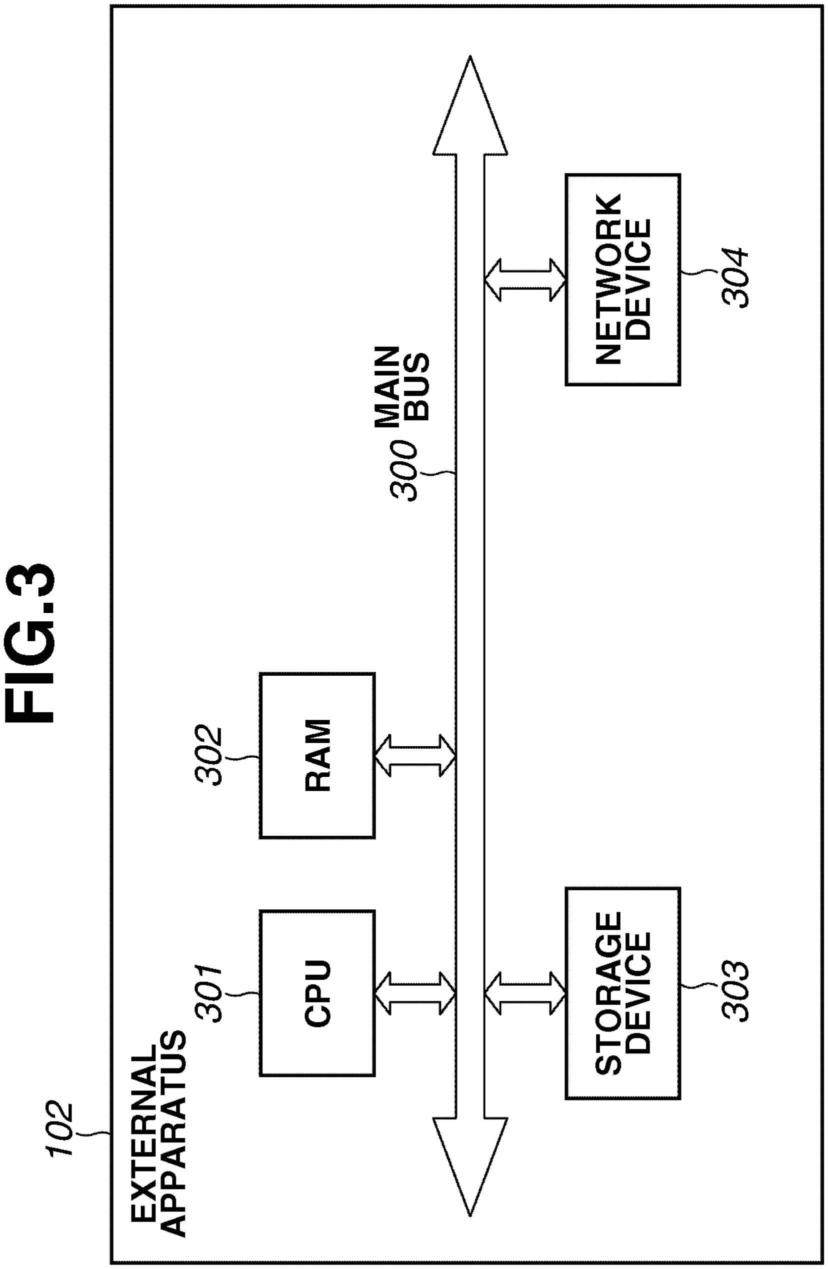
FIG. 3 is a block diagram illustrating a hardware configuration of the external apparatus illustrated in FIG. 1.

FIG. 3 illustrates an example of a hardware configuration of the external apparatus 102 illustrated in FIG. 1. The external apparatus 102 includes a CPU 301 that controls an entire apparatus, a RAM 302 that provides the CPU 301 with a work area, a storage device 303 that stores data, various setting parameters, and control programs, a network device 304 that communicates with the MFP 101 and other devices via the network, and a main bus 300.

Figure 4:
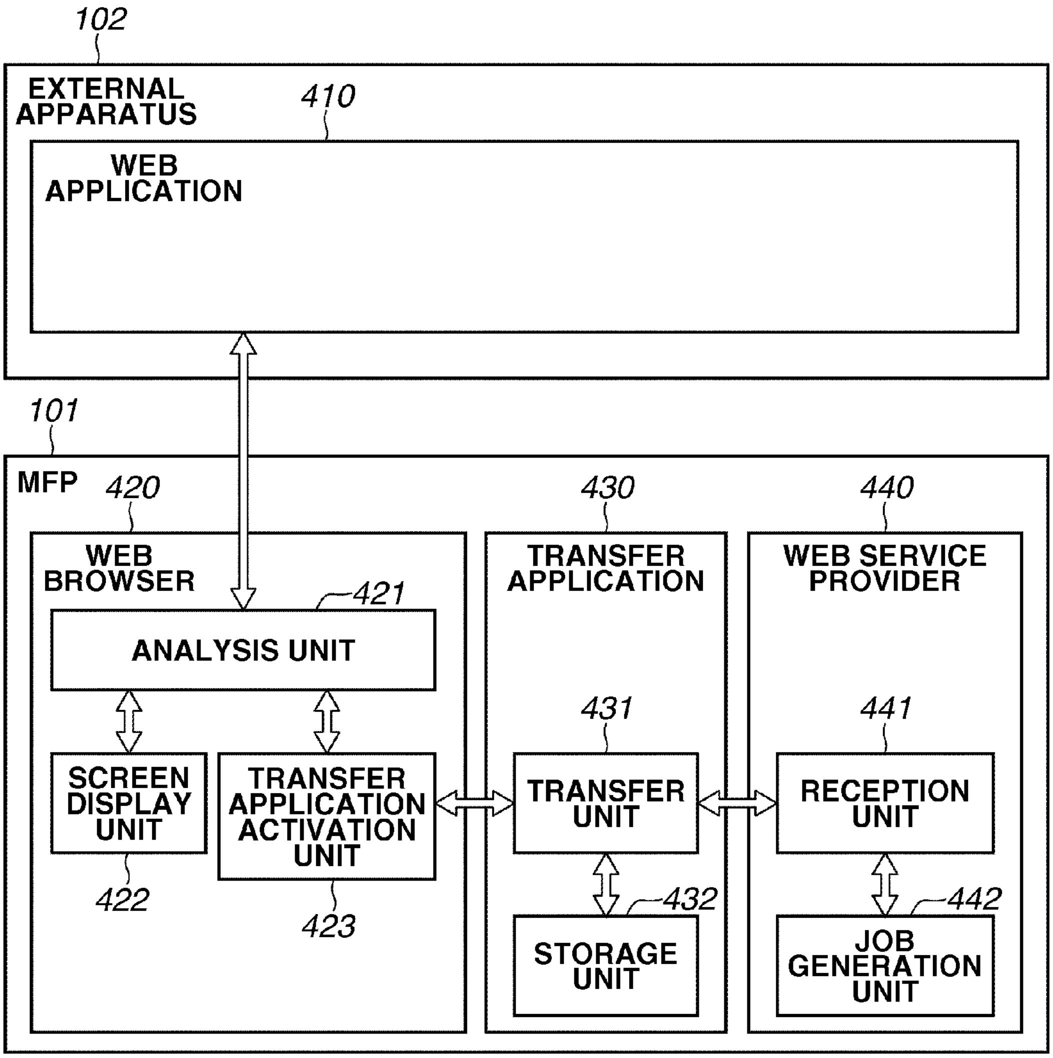
FIG. 4 is a block diagram illustrating a software configuration of the information processing system illustrated in FIG. 1.

FIG. 4 illustrates a software configuration of the information processing system illustrated in FIG. 1.

A web application 410 that operates in the external apparatus 102 is stored in the storage device 303 and executed by the CPU 301.

The web application 410 is an application for executing processing according to various requests included in a message received from the MFP 101. For example, the web application 410 can create a hypertext markup language (HTML) content for the operation screen to be displayed by a web browser 420 of the MFP 101. In addition, the web application 410 can generate a processing request according to the SOAP to the MFP 101 according to the user's operation received via this operation screen.

On the other hand, the MFP 101 includes the web browser 420, a transfer application 430, and a web service provider 440. The function of each unit is realized when the CPU 201 of the MFP 101 executes the program stored in the storage device 205.

The web browser 420 is an application for communicating with the web application 410 operating in the external apparatus 102 and displaying on the display device 207 the web content provided by the external apparatus 102.

An analysis unit 421 of the web browser 420 analyzes a message received from the web application 410. A screen display unit 422 displays on the display device 207 the operation screen based on the HTML contents included in the received message.

A transfer application activation unit 423 activates the transfer application 430 based on the analysis result of the analysis unit 421. The HTML contents are an example of screen information provided by the external apparatus 102.

The transfer application 430 is an application for transferring information included in the message received by the web browser 420 to the web service provider 440 and transferring a processing result of the web service provider 440 to the web browser 420. The transfer application 430 operates as a helper application which can change a file (audio, video, and animation) having a format that the web browser 420 generally cannot deal with into a processable form, and independently operates as a web browser. However, if having a function for transferring a processing request, the transfer application 430 may operate as a function of a plug-in or the web browser 420, or Java (registered trademark) Script described in a received response, instead of operating as a helper application.

A transfer unit 431 of the transfer application 430 transfers to the web service provider 440 the processing request acquired from the web browser 420, and transfers to the web browser 420 a processing response acquired from the web service provider 440. The storage unit 432 temporarily stores information necessary for performing transfer to the transfer unit 431.

The web service provider 440 is an application for causing the MFP 101 to execute image processing according to the processing request received from the transfer application 430 of the MFP 101 or the external apparatus 102. The web service provider 440 receives the request according to a communication protocol of the SOAP. Based on a command included in the received request according to the SOAP, the web service provider 440 generates a job as a web service using hardware resources (e.g., the reading device 203, the print device 204, and the network device 208) included in the MFP 101. The web service provider 440 then executes the generated job by a job execution application (not illustrated). The job includes a copy job, a print jot, an image transmitting job, and the like.

Figure 5:
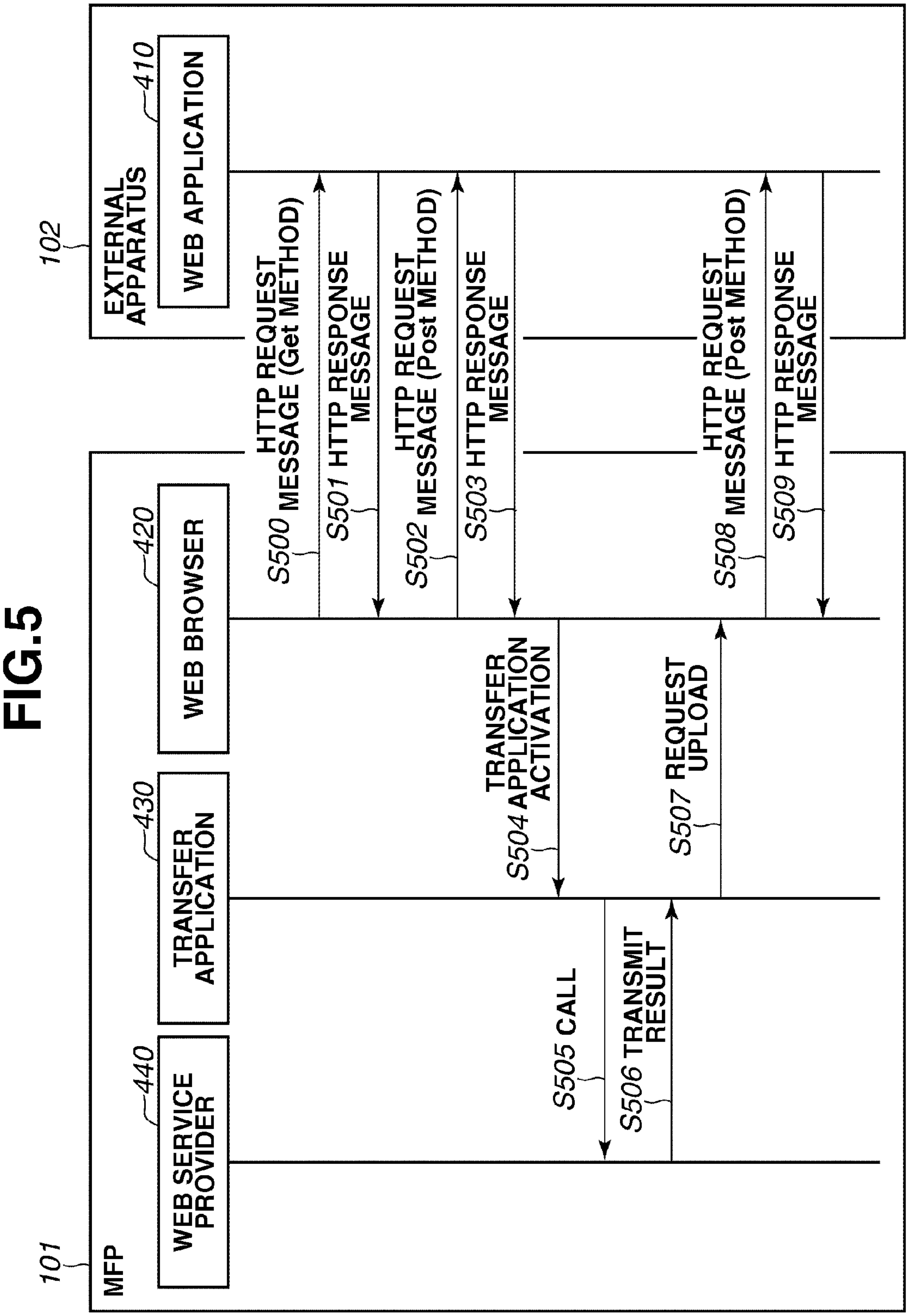
FIG. 5 is a sequence diagram illustrating a processing procedure of the MFP and the external apparatus illustrated in FIG. 1.

With reference to FIG. 5, a processing procedure performed by the MFP 101 and the external apparatus 102 according to the present exemplary embodiment will be described. First, when the input device 206 of the MFP 101 detects that the user has pressed a button (not illustrated) for activating the web browser, the CPU 201 activates the web browser 420.

After activation, in step S500, based on a uniform resource locator (URL) indicating a storage location of the HTML content for displaying the operation screen, the web browser 420 requests the operation screen from the web application 410 of the external apparatus 102. According to the present exemplary embodiment, the URL is previously set for the web browser 420. In step S501, the web application 410 generates or acquires the HTML content, and transmits to the web browser 420 the HTML content included in the message of the HTTP. The web browser 420 analyzes the HTML content included in the received message and displays the operation screen on the display device 207.

The web browser 420 receives the user's operation via the operation screen displayed on the display device 207. For example, in step S502, if "transmitting an image acquired by scanning a document according to a file transfer protocol (FTP)" is directed via the operation screen, the web browser 420 transmits the message including the user's operation to the web application 410.

The web application 410 generates a processing request according to the SOAP protocol for using the web service. The processing request, which is issued by the web application 410 to request the web service provider 440 to execute an image processing function based on the user's operation, remotely calls the web service provider 440 by a technique referred to as a remote procedure call. In step S503, the web application 410 returns the message including the generated processing request to the web browser 420.

In step S505, the transfer application 430 extracts the processing request from the received message, transfers the processing request to the web service provider 440. The web service provider 440 generates and performs a job according to the processing request. In step S507, the web service provider 440 transmits a processing response indicating a result of the processing in step S505 to the transfer application 430. In step S507, the transfer application 430 requests the web browser 420 to transmit a message including the processing response to the external apparatus 102. The web browser 420 having received the request transmits to the external apparatus 102 the processing response indicating the processing result in step S505 and a message including a request for the operation screen to be subsequently displayed by the browser.

According to the present exemplary embodiment, the request of the web service to the web service provider 440 is generated by the web application 410 of the external apparatus 102 according to the user's operation via the operation screen displayed on the web browser 420. Thus, the processing request according to the SOAP for calling the web service does not need to be generated by the MFP 101.

Figure 6:
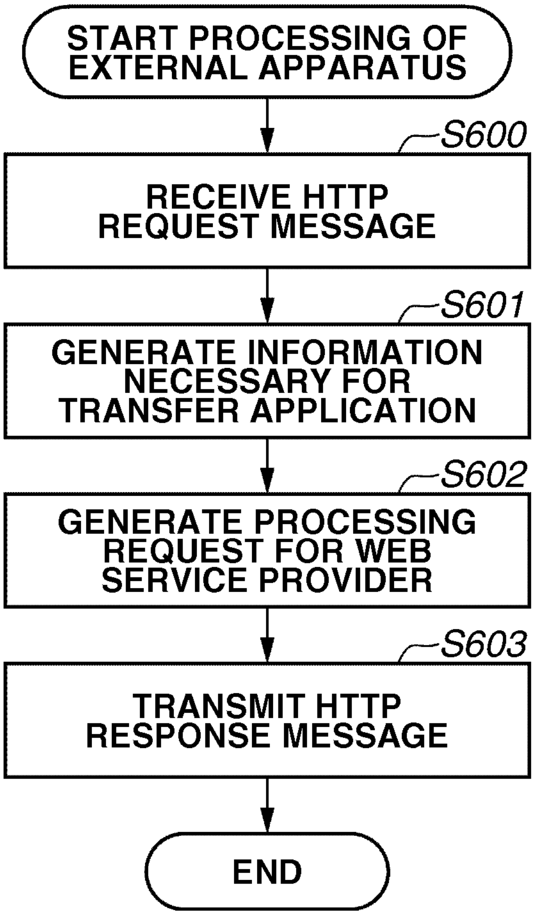
FIG. 6 is a flowchart of processing executed by the MFP illustrated in FIG. 1.

FIG. 6 is a flowchart illustrating the processing by the external apparatus 102 according to the present exemplary embodiment. The web application 410 for executing each step of the flowchart illustrated in FIG. 6 is stored in the storage device 303 of the external apparatus 102, loaded in the RAM 302, and then performed by the CPU 301.

In the following description, a message to be transmitted by the web browser 420 to the web application 410 is referred to as an "HTTP request message", and a message to be transmitted by the web application 410 to the web browser 420 is referred to as an "HTTP response message". The web browser 420 can include, in the HTTP request message, a command for requesting the operation screen, and a command for requesting to another web application 410. On the other hand, the web application 410 can include, in the HTTP response message, a command for requesting scanning processing and a command for requesting FTP transmission processing to the MFP 101. Accordingly, the MFP 101 and the external apparatus 102 can realize a configuration to mutually transmit and receive the processing request and response.

According to the present exemplary embodiment, between the external apparatus 102 and the network 100, a gateway is provided (not illustrated). In this case, although a connection request from the MFP 101 to the external apparatus 102 is generally permitted, the connection request from the external apparatus 102 to the MFP 101 is not permitted. Therefore, information to be transmitted from the external apparatus 102 to the MFP 101 is included in the HTTP response message, which is the response to the HTTP request message transmitted from the MFP 101, and transmitted.

The processing illustrated in flowchart in FIG. 6 is started when the web browser 420 transmits to the web application 410 the HTTP request message including the user's operation in step S502 in FIG. 5.

In step S600, the web application 410 receives the HTTP request message transmitted from the web browser 420. The received HTTP request message includes information about the user's operation performed via the operation screen displayed on the web browser 420. According to the present exemplary embodiment, an operation of "transmitting an image acquired by scanning a document according to FTP" will be described as an example.

In step S601, the web application 410 creates a header 800 of the HTTP response message as illustrated in FIG. 8.

FIG. 8 is an example of the header of the HTTP response message to be transmitted from the web application 410 to the web browser 420.

The header 800 includes a transfer address 801, a time-out time 802, a transfer content type 803, an upload address 804, and a content type 805.

The transfer address 801 is the address (http://127.0.0.1:80/aa/bb) for transferring a processing request 900 (described below with reference to FIG. 9) from the transfer application 430 via the web browser 420 to the web service provider 440. The transfer address 801 indicates any of web service addresses publicized by one or a plurality of web service providers 440. The transfer address 801 is described in a format including a local IP address (127.0.0.1) of the MFP 101, a port number (80) allocated to the web service provider 440, and a pass name (aa/bb) of the web service provider 440.

The time-out time 802 is information for determining whether a communication time for performing communication between the transfer application 430 and the 440 reaches a predetermined time (120 seconds).

The transfer content type 803 is information for indicating a format of the processing request 900 described below. The transfer content type 803 is used as an identifier for determining whether the format of the processing request indicated by the transfer content type 803 corresponds to a format that can be received by the web service provider 440.

The upload address 804 is the address (http://aaa.co.jp/bbb/ccc) for transmitting (uploading) to the web application 410 a processing response 1000 in response to the processing request 900.

The content type 805 is an identifier (application/vnd.xxx-.webservice) for identifying whether the HTTP response message includes the processing request to the web service provider 440.

In step S602, the web application 410 generates the processing request 900 illustrated in FIG. 9 according to the user's operation included in the HTTP request message.

FIG. 9 is an example of the processing request 900 generated by the web application 410 in step S602. According to the present exemplary embodiment, the processing request 900 is described in a format according to an extensible markup language (XML). More specifically, the processing request 900 includes a scanning request 901 and an FTP transmission request 902.

The scanning request 901 is a command for requesting the reading device 203 to execute scanning processing. Further, in the scanning request 901, a setting value for controlling scanning can be described. For example, a size of a document to be scanned can be specified with a DocumentSize tag, or a color mode (auto, color, or gray scale) for scanning can be specified with a Color tag. Such parameters may be specified by the user via the operation screen displayed by the web browser of the MFP 101 or automatically specified by the web application 410.

The FTP transmission request 902 is a command for requesting the network device 208 to transmit scanned image data. The FTP transmission request 902 includes the specifications of the communication protocol (FTP) and the file format.

In step S603, the web application 410 transmits to the web browser 420 the HTTP response message including the header 800 and the processing request 900 related to the header 800, and then ends the processing illustrated in flowchart in FIG. 6.

Figure 7:
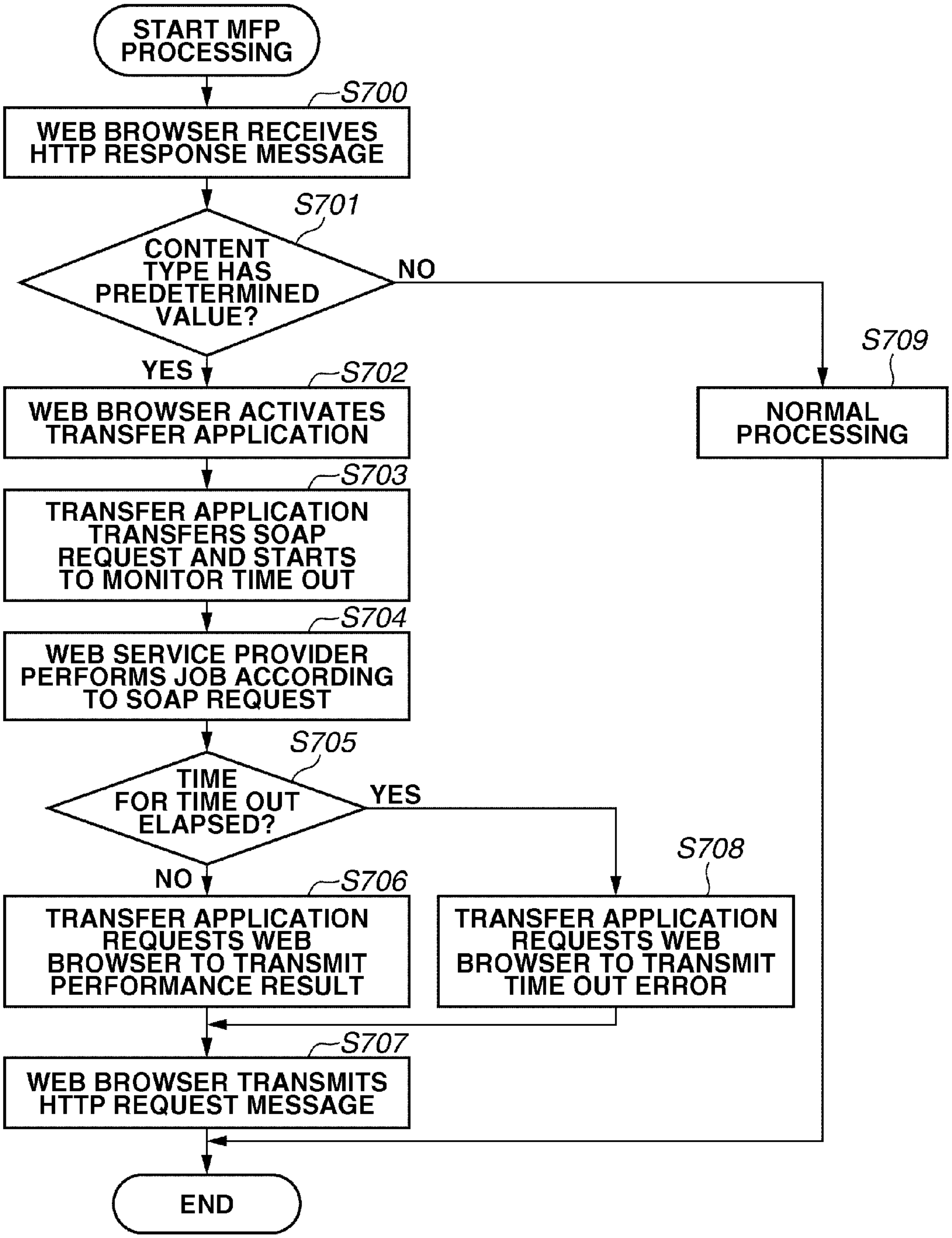
FIG. 7 is a flowchart of processing executed by the external apparatus illustrated in FIG. 1.

FIG. 7 is a flowchart illustrating the processing performed by the MFP 101 according to the present exemplary embodiment. The program for executing each step in the flowchart illustrated in FIG. 7 is stored in the storage device 205 of the MFP 101. The program is loaded by the RAM 202 and performed by the CPU 201.

The flowchart in FIG. 7 illustrates processing after the web application 410 has transmitted the HTTP response message in step S603 illustrated in FIG. 6.

In step S700, the web browser 420 receives the HTTP response message transmitted from the web application 410 in step S603.

In step S701, the analysis unit 421 of the web browser 420 analyzes the header 800 included in the HTTP response message received in step S700. As a result of the analysis, when the Content-Type field of the header 800 includes "application/vnd.xxx.webservice" (YES in step S701), the processing proceeds to step S702. If not (NO in step S701), the processing proceeds to step S709.

In step S702, the transfer application activation unit 423 of the web browser 420 activates the transfer application 430. The transfer application activation unit 423 requests the transfer application 430 to directly transfer to the web service provider 440 the processing request 900 included in the HTTP response message received in step S700. At this point, the processing request 900 included in the HTTP response message received in step S700 and the information about the header 800 related to the processing request 900 (the transfer address 801, the time-out time 802, the transfer content type 803, the upload address 804, and the content type 805) are provided to the transfer application 430.

In step S703, the transfer application 430 temporarily stores in the storage unit 432 the information (the transfer address 801, the time-out time 802, the transfer content type 803, the upload address 804, and the content type 805) provided in step S702. The transfer application 430 transfers the processing request 900 included in the HTTP response message received in step S700 to the web service provider 440 specified by the transfer address 801. Further, at this point, the transfer application 430 acquires the current time inside to measure a time, and starts to monitor whether a measured value reaches the time-out time 802. The monitor of the time is continued up to step S705 described below.

In step S704, the web service provider 440 causes the reception unit 441 to receive the processing request 900 transmitted from the transfer application 430 in step S703, the job generation unit 442 to generate a job according to the processing request 900, and the processing unit of the MFP 101 to execute the image processing as the web service. According to the present exemplary embodiment, the image reading function reads the document to create image data according to the scanning request 901. Then, according to the FTP transmission request 902, the image data is transmitted to the specified address (192.168.11.xxx) by the image transmission function. The web service provider 440 transmits a processing response 1000 indicating the processing result to the transfer application 430.

FIG. 10 illustrates an example of the processing response 1000 generated by the web service provider 440. A processing result 1001 describes a result of the processing executed in step S704 in a ResultCode tag. When the processing in response to the call from the web service is normally completed, "OK" is described as the processing result. When an error occurs during the processing, an error code is described as the processing result.

In step S705, the transfer application 430 determines whether a time having elapsed since the processing request 900 has been transmitted in step S703 reaches the time-out time 802. When it is determined that the elapse time reaches the time-out time 802 (YES in step S705), the processing proceeds to S708. If not (NO in step S705), the processing proceeds to step S706.

In step S706, the transfer application 430 receives the processing response 1000 from the web service provider 440. The transfer application 430 requests the web browser 420 to transmit (upload) to the web application 410 the HTTP request message including the processing response 1000. When requesting, the transfer application 430 specifies the upload address 804 stored in the storage unit 432 as the address for transmitting the HTTP request message. At this point, the transfer application 430 transfers the received processing response 1000 to the web browser 420.

According to the present exemplary embodiment, the address to be uploaded is based on the upload address 804 stored in the storage unit 432 in step S702, however, information about the upload address stored by the web browser 420 may be used. Further, if the upload address is defined as a fixed value determined by the MFP 101 and the external apparatus 102, the upload address does not need to be specified from the web application 410.

In step S707, according to the request of the transfer application 430, the web browser 420 transmits (uploads) the HTTP request message including the processing response 1000 or a time-out error 1100, and then returns the processing to step S701. The web application 410 receives the processing response 1000 by the upload performed by the web browser 420, so that the web application 410 can generate the HTML content according to the processing result of the web service provider 440 and transmit the HTML content to the web browser 420.

Processing in step S708 is performed when it is determined that the time-out time 802 has elapsed in step S705. In step S708, the transfer application 430 generates a time-out error 1100 illustrated in FIG. 11, and then stops the communication with the web service provider 440. The transfer application 430 requests the web browser 420 to transmit (upload) the HTTP request message including the time-out error 1100 to the web application 410.

FIG. 11 illustrates contents of the time-out error 1100 generated by the transfer application 430. The time-out error 1100 describes an error code and a status code when the transfer application 430 and the web service provider 440 communicate with each other via the HTTP communication protocol.

Processing in step S709 is performed when it is determined in step S701 that the Content-Type field of the header 800 is not the predetermined value (application/vnd.xxx.webservice). In step S709, the web browser 420 displays the operation screen on the display device 207 based on the analysis result of the HTTP response message by the analysis unit 421, and then ends the processing of the flowchart in FIG. 7.

As described above, according to the present exemplary embodiment, when transmitting the processing request, the processing request to the MFP 101 (web service provider 440) is included in the HTTP response message to be transmitted from the web application 410 to the web browser 420. Thus, the external apparatus 102 can transmit the processing request to the MFP 101 over a firewall and a mechanism of network address conversion. Further, since a function of the web service provider 440 is called from the external device using the remote procedure call technique, a processing workload of the MFP 101 and a processing workload of the external apparatus 102 can be distributed.

According to the present exemplary embodiment, a case in which the firewall exists between the external apparatus 102 and the MFP 101 is considered. Therefore, all messages transmitted from the external apparatus 102 to the MFP 101 are transmitted as responses to the messages that have transmitted from the MFP 101 to the external apparatus 102. However, as a modification example, if it is determined that a barrier such as the firewall does not exist, the external apparatus 102 may directly transmit the message to the web service provider 440 of the MFP 101.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-251903 filed Nov. 10, 2010, which is hereby incorporated by reference herein in its entirety.

What is claimed is:

1. An information processing system including an image processing apparatus and a web server, the information processing system comprising:

the web server, wherein the web server includes:

a web server network device configured to receive a request message which is sent from a web browser of the image processing apparatus, at least one web server processor, a generation unit implemented by the at least one web server processor and configured to generate a response message corresponding to the request message received by the web server network device, wherein the response message includes a command for causing the image processing apparatus to execute a job and an address for uploading information indicative of a result of the job, and timeout information related to the execution of the job, and a sending unit implemented by the web server network device and configured to send the response message generated by the generation unit to the web browser of the image processing apparatus; and the image processing apparatus, wherein the image processing apparatus includes:

at least one image processing apparatus processor, a job execution unit implemented by the at least one image processing apparatus processor and configured to execute the job in accordance with the command included in the response message which is sent from the web server and is received by the web browser, a monitor unit implemented by the at least one image processing apparatus processor and configured to monitor timeout related to the job executed by the job execution unit, based on the timeout information included in the response message sent from the web server, an image processing apparatus network device, a first upload unit implemented by the image processing apparatus network device and configured to upload, in a case where the monitor unit determines that the timeout related to the job executed by the job execution unit does not occur, information indicative of a result of execution of the job executed by the job execution unit to the address included in the response message sent from the web server, and a second upload unit implemented by the image processing apparatus network device and configured to upload, in a case where the monitor unit determines that the timeout related to the job executed by the job execution unit occurs, information indicative of timeout error to the address included in the response message sent from the web server.

2. The information processing system according to claim 1, wherein the job is a scan job, a print job, or an image transmission job.

3. The information processing system according to claim 1, wherein the command is described in a format according to an extensible markup language.

4. The information processing system according to claim 1, wherein the result of the job is a job error or job completion.

5. The information processing system according to claim 1, wherein the request message includes information about a user operation performed via an operation screen on the web browser.

6. The information processing system according to claim 1, wherein the generation unit is configured to generate a header of the response message including the address.

7. The information processing system according to claim 1, wherein the response message includes identification information of a web service provider.

8. The information processing system according to claim 7, wherein the response message includes an Internet Protocol (IP) address, a port number for the web service provider, and a path of the web service provider.

9. The information processing system according to claim 1, wherein, in a case where predetermined time has elapsed, the first upload unit is configured to upload information indicative of timeout error instead of the result of the job.

10. A method for controlling an information processing system including an image processing apparatus and a web server, the method comprising:

receiving, at the web server, a request message which is sent from a web browser of the image processing apparatus;

generating, at the web server, a response message corresponding to the received request message, wherein the response message includes a command for causing the image processing apparatus to execute a job and an address for uploading information indicative of a result of the job, and timeout information related to the execution of the job;

sending, from the web server, the generated response message to the web browser of the image processing apparatus;

executing, at the image processing apparatus, the job in accordance with the command included in the response message which is sent from the web server and is received by the web browser;

monitoring, at the image processing apparatus, timeout related to the executed job, based on the timeout information included in the response message sent from the web server, uploading, as a first upload at the image processing apparatus and in a case where it is determined that the timeout related to the executed job does not occur, information indicative of a result of execution of the executed job to the address included in the response message sent from the web server; and uploading, as a second upload at the image processing apparatus and in a case where it is determined that the timeout related to the executed job occurs, information indicative of timeout error to the address included in the response message sent from the web server.

* * * * *